United States Patent
Cai et al.

(10) Patent No.: US 11,482,166 B2
(45) Date of Patent: Oct. 25, 2022

(54) OLED DRIVING POWER SOURCE AND OLED TELEVISION

(71) Applicant: SHENZHEN CHUANGWEI-RGB ELECTRONIC CO., LTD, Guangdong (CN)

(72) Inventors: Shengping Cai, Shenzhen (CN); Zongwang Wei, Shenzhen (CN); Jianhua Zhou, Shenzhen (CN); Zhenyu Guo, Shenzhen (CN); Qifeng Dai, Shenzhen (CN)

(73) Assignee: SHENZHEN CHUANGWEI-RGB ELECTRONIC CO., LTD, Shenzhen (CN)

( * ) Notice: Subject to any disclaimer, the term of this patent is extended or adjusted under 35 U.S.C. 154(b) by 98 days.

(21) Appl. No.: 17/058,305

(22) PCT Filed: Nov. 2, 2018

(86) PCT No.: PCT/CN2018/113657
§ 371 (c)(1),
(2) Date: Nov. 24, 2020

(87) PCT Pub. No.: WO2020/047986
PCT Pub. Date: Mar. 12, 2020

(65) Prior Publication Data
US 2021/0217357 A1    Jul. 15, 2021

(30) Foreign Application Priority Data
Sep. 7, 2018  (CN) .......................... 201811044599.3

(51) Int. Cl.
G09G 3/3208    (2016.01)
H02M 1/42      (2007.01)
(Continued)

(52) U.S. Cl.
CPC ........ *G09G 3/3208* (2013.01); *H02M 1/4208* (2013.01); *H04N 5/63* (2013.01);
(Continued)

(58) Field of Classification Search
CPC .......... G09G 3/3208; G09G 2330/026; H02M 1/4208; H02M 1/4225; H02M 1/007;
(Continued)

(56) References Cited

U.S. PATENT DOCUMENTS 11,308,871 B2 * 4/2022 Cai ..................... H02M 1/4208
2010/0259240 A1  10/2010 Cuk
(Continued)

FOREIGN PATENT DOCUMENTS

CN        202008730 U    10/2011
CN        102821522 A    12/2012
(Continued)

OTHER PUBLICATIONS

English machine translation of CN 103889118 A. (Year: 2014).*
(Continued)

Primary Examiner — Stephen G Sherman
(74) Attorney, Agent, or Firm — Maier & Maier, PLLC

(57) ABSTRACT

An OLED driving power source includes a power supply board connected to main board and OLED screen, power supply board includes standby circuit, power supply circuit, first conversion module, second conversion module and switch; after powering on, standby circuit supplies mainboard and power supply circuit, power supply circuit starts first conversion module to output first voltage and second voltage to power mainboard and output HVDC to second conversion module, switch converts first voltage to first enabling voltage to supply OLED screen according to first enabling signal from mainboard; power supply circuit starts second conversion module to convert HVDC into second
(Continued)

enabling voltage to power and light up OLED screen, first conversion module comprises bridgeless PFC circuit and auxiliary path LLC control circuit integrated into same semiconductor chip encapsulation, and omitting specific standby circuit, circuit structure is simplified, area of power supply board is reduced, and production cost is reduced.

14 Claims, 9 Drawing Sheets

(51) Int. Cl.
  *H04N 5/63* (2006.01)
  *H02M 1/44* (2007.01)
  *H02M 3/24* (2006.01)
(52) U.S. Cl.
  CPC .......... *G09G 2330/026* (2013.01); *H02M 1/44* (2013.01); *H02M 3/24* (2013.01)
(58) Field of Classification Search
  CPC .......... H02M 1/44; H02M 3/24; H02M 3/015; H02M 3/285; H04N 5/63; H05B 45/39; Y02B 70/10
  See application file for complete search history.

(56) References Cited

U.S. PATENT DOCUMENTS

| | | | |
|---|---|---|---|
| 2011/0188273 | A1 | 8/2011 | Pansier et al. |
| 2017/0006688 | A1* | 1/2017 | Dai .................. H02M 7/04 |
| 2017/0231041 | A1* | 8/2017 | Yang ................ H05B 45/385 |
| 2020/0321854 | A1* | 10/2020 | Joo .................. H02M 1/4225 |
| 2020/0328671 | A1* | 10/2020 | Li .................... H02M 3/1582 |

FOREIGN PATENT DOCUMENTS

| | | |
|---|---|---|
| CN | 203243211 U | 10/2013 |
| CN | 103889118 A | 6/2014 |
| CN | 106409220 A | 2/2017 |
| EP | 3444801 A1 | 2/2019 |
| IN | 202027052539 A | 2/2021 |

OTHER PUBLICATIONS

Extended European Search Report dated Oct. 6, 2021, in connection with corresponding European Application No. 18932868.5; 10 pages.
Office Action dated Jun. 30, 2021, in connection with corresponding Indian Application No. 202027052540 (6 pp., including machine-generated English translation).
International Search Report dated May 31, 2019 in corresponding International application No. PCT/CN2018/113657; 6 pages.

* cited by examiner

OLED DRIVING POWER SOURCE AND OLED TELEVISION

CROSS-REFERENCES TO RELATED APPLICATIONS

This application is a national stage application of PCT Patent Application No. PCT/CN2018/113657, filed on Nov. 2, 2018, which claims priority to Chinese Patent Application No. 201811044599.3, filed on Jul. 9, 2018, the content of all of which is incorporated herein by reference.

FIELD

The present disclosure relates to the technical field of power supply, and, more particularly, to an OLED driving power source and an OLED television.

BACKGROUND

An OLED (Organic Light Emitting Diode), due to a plurality of advantages including no need of backlight, no need of color filter and liquid crystal, as well as being able to emit light by itself, and being superior to a traditional LCD and LED in a plurality of terms, including image quality, response speed, thickness, visual angle and more, has a relatively wide application in recent years. Following a gradual maturation of an OLED technology, a television taking an OLED as a display scheme will replace the traditional LCD and LED television gradually, meanwhile, an OLED television, comparing to the traditional LCD and LED television, not only has a qualitative leap in image quality, but also has the characteristics of thin thickness, flexibility and more. Due to an existing OLED television, compared to the traditional LCD and LED, has a higher requirement on a time sequence of a power and a relatively higher power, thus the volume of a power supply board is pretty large.

In addition, referencing to FIG. 1 and FIG. 2, an existing OLED driving power source usually adopts a multi-path independent control output, all main circuits are mutually independent and controlled by a mainboard signal, wherein a standby circuit outputs 5V to supply power to a mainboard, and an auxiliary winding supplies power to a PFC circuit, an auxiliary path LLC controller and a main LLC controller respectively through an output power supply of a power supply circuit. When a television is powered on, the existing output 5V supplies power to a mainboard, and after the mainboard starts to work, enable the main circuit to output in a sequence according to a certain time sequence. When in a standby starts, the mainboard receives a standby signal, and turns off the output from the main circuit according to a certain time sequence in a sequence, before entering a standby state. An architecture of the driving power source, wherein an output of each circuit is mutually independent, a relationship between each circuit is definite and a logic is clear, very convenient to a time sequence control, but an overall architecture is relatively complex.

Therefore, the current technology needs to be improved and developed.

SUMMARY

According to the above described defects, the purpose of the present disclosure is providing an OLED driving power source and an OLED television, by integrating a bridgeless PFC and an auxiliary path LLC control circuit into a control chip, a requirement of the OLED television on a power output stability and a timing control is met, and a circuit structure is optimized, an area of a power supply board is reduced, and a production cost is reduced.

A technical solution of the present disclosure to solve the above technical problems is as follows:

An OLED driving power source, comprising a power supply board connected with a mainboard and an OLED screen, wherein the power supply board comprises a standby circuit, a power supply circuit, a first conversion module, a second conversion module and a switch;

after powering on, the standby circuit outputs supply voltage to the mainboard and the power supply circuit; the power supply circuit starts the first conversion module according to an on-off signal output from the mainboard, the first conversion module outputs a first voltage and a second voltage to supply power to the mainboard, as well as outputs a high-voltage direct current (HVDC) to the second conversion module; the switch converts the first voltage into a first enabling voltage before outputting to the OLED screen for power according to a first enabling signal output from the mainboard; the power supply circuit controls the second conversion module to start according to a second enabling signal output from the mainboard, the second conversion module converts the high-voltage direct current into a second enabling voltage to supply power to and light up the OLED screen;

the first conversion module comprises a bridgeless PFC circuit and an auxiliary path LLC control circuit integrated in a same semiconductor chip package, the bridgeless PFC circuit starts and outputs a high-voltage direct current to the auxiliary path LLC control circuit, the auxiliary path LLC control circuit converts the high-voltage direct current into the first voltage and the second voltage before outputting to the mainboard for power.

The OLED driving power source, wherein the power supply circuit comprises an on-off control circuit and an enabling switching circuit, the on-off control circuit outputs a first power to start the bridgeless PFC circuit according to the on-off signal output from the mainboard, and outputs a second power to the auxiliary path LLC control circuit for power, and outputs a third power to the enabling switching circuit according to the high-voltage direct current output from the bridgeless PFC circuit; the enabling switching circuit converts the third power into a fourth power before outputting to the second conversion module according to the second enabling signal output from the mainboard.

The OLED driving power source, wherein the auxiliary path LLC control circuit comprises an auxiliary path LLC controller and a first transformer, the auxiliary path LLC controller starts the first transformer according to the second power output from the on-off control circuit, and the first transformer converts the high-voltage direct current output from the bridgeless PFC circuit into the first voltage and the second voltage before outputting to the mainboard.

The OLED driving power source, wherein the second conversion module comprises a main LLC controller and a second transformer, the main path LLC controller starts the second transformer according to the fourth power output from the enabling switching circuit, the second transformer converts the high-voltage direct current output from the bridgeless PFC circuit into the second enabling voltage to power the OLED screen.

The OLED driving power source, wherein the standby circuit comprises a standby circuit controller and a third transformer, the standby circuit controller outputs supply power to power the mainboard and the power supply circuit through the third transformer.

The OLED driving power source, wherein the on-off control circuit comprises a first control sub-circuit and a second control sub-circuit, the first control sub-circuit outputs the first power to start the bridgeless PFC circuit according to the on-off signal output from the mainboard, and outputs the second power to the auxiliary path LLC control circuit, and the second control sub-circuit outputs the third power to the enabling switching circuit according to the high-voltage direct current output from the bridgeless PFC circuit.

The OLED driving power source, wherein the first control sub-circuit comprises a first diode, a first Zener diode, a second Zener diode, a first triode, a second triode, a third triode, a first resistor, a second resistor, a third resistor, a fourth resistor, a fifth resistor, a sixth resistor, a seventh resistor, an eighth resistor, a first capacitor, a second capacitor, a third capacitor and a first optical coupler;

an anode of the first diode connects to the mainboard; a cathode of the first diode connects to one end of the second resistor, one end of the first capacitor and a base of the first triode through the first resistor; another end of the second resistor, another end of the first capacitor and an emitter of the first triode are all grounded; a collector of the first triode connects to a second pin of the first optical coupler, and connects to a first pin of the first optical coupler and one end of the fourth resistor through the third resistor; a third pin of the first optical coupler connects to one end of the sixth resistor, a cathode of the first Zener diode and a base of the second triode through the fifth resistor; a fourth pin of the first optical coupler connects to a collector of the second triode and the auxiliary path LLC control circuit; an emitter of the second triode connects to a collector of the third triode and one end of the eighth resistor; another end of the eighth resistor connects to one end of the seventh resistor, a base of the third triode and a cathode of the second Zener diode; another end of the sixth resistor, an anode of the first Zener diode, another end of the second capacitor, another end of the seventh resistor, an anode of the second Zener diode and one end of the third capacitor are all grounded; an emitter of the third triode connects to the bridgeless PFC circuit, the second control sub-circuit and another end of the third capacitor.

In the OLED driving power source, the second control sub-circuit includes a ninth resistor, a tenth resistor, an eleventh resistor, a twelfth resistor, a thirteenth resistor, a fourteenth resistor, a fifteenth resistor, a sixteenth resistor, a seventeenth resistor, a fourth triode, a second diode, a third diode, a fourth diode, a fourth capacitor, a fifth capacitor, a sixth capacitor and a first shunt reference source;

an emitter of the fourth triode connects to the first control sub-circuit, and also connects to one end of the tenth resistor and a negative electrode of the first shunt reference source through the ninth resistor; a base of the fourth triode connects to a negative electrode of the first shunt reference source through the tenth resistor; a collector of the fourth triode connects to an anode of the fourth diode, and also connects to an anode of the second diode through the eleventh resistor; a cathode of the fourth diode connects to the enabling switching circuit; a cathode of the second diode connects to a cathode of the third diode, a feedback pin of the first shunt reference source, and gets grounded through the fourth capacitor; a positive electrode of the first shunt reference source gets grounded; an anode of the third diode connects to one end of the thirteenth resistor, one end of the fifth capacitor, one end of the sixth capacitor, and one end of the fourteenth resistor through the twelfth resistor. Another end of the thirteenth resistor, another end of the fifth capacitor, and another end of the sixth capacitor are all grounded; another end of the fourteenth resistor connects with the fifteenth resistor, the sixteenth resistor, and the seventeenth resistor in series successively and then connects to the bridgeless PFC circuit.

In the OLED driving power source, the enabling switching circuit includes a fifth diode, an eighteenth resistor, a nineteenth resistor, a twentieth resistor, a twenty-first resistor, a twenty-second resistor, a seventh capacitor, a fifth triode, a sixth triode, a third Zener diode and a second optical coupler;

an anode of the fifth diode connects to the main board; a cathode of the fifth diode connects to one end of the nineteenth resistor, one end of the seventh capacitor and a base of the fifth triode through the eighteenth resistor; another end of the nineteenth resistor, another end of the seventh capacitor, and an emitter of the fifth triode are all grounded; a collector of the fifth triode connects to a second pin of the second optical coupler; a first pin of the second optical coupler connects to the on-off control circuit through the twentieth resistor; a third pin of the second optical coupler connects to one end of the twenty-second resistor, a cathode of the third Zener diode and a base of the sixth triode through the twenty-first resistor; a fourth pin of the second optical coupler connects to the on-off control circuit and a collector of the sixth triode; an emitter of the sixth triode connects to the second conversion module; another end of the twenty-second resistor and an anode of the third Zener diode are both grounded.

In the OLED driving power source, the first triode, the second triode and the third triode are all NPN triodes.

In the OLED driving power source, a model of the first optical coupler is BPC-817C.

In the OLED driving power source, the fourth triode is a PNP triode.

In the OLED driving power source, the fifth triode and the sixth triode are both NPN triodes.

In the OLED driving power source, a model of the second optical coupler is BPC-817C.

An OLED television includes the above-mentioned OLED driving power source.

Comparing to the prior art, the present disclosure provides an OLED driving power source and an OLED television, the OLED driving power source comprises a power supply board connected with a mainboard and an OLED screen, the power supply board comprises a standby circuit, a power supply circuit, a first conversion module, a second conversion module and a switch. After powering on, the standby circuit supply power to the mainboard and the power supply circuit; the power supply circuit starts the first conversion module to output a first voltage and a second voltage to the mainboard for power, and output a high-voltage direct current to the second conversion module, the switch converts the first voltage into a first enabling voltage to supply power to the OLED screen; the power supply circuit starts the second conversion module to convert the high-voltage direct current to a second enabling voltage to power and light up the OLED screen; wherein the first conversion module comprises a bridgeless PFC circuit and an auxiliary path LLC control circuit integrated in a same semiconductor chip package. By integrating the bridgeless PFC and the auxiliary path LLC control circuit into one control chip, a circuit structure is optimized, an area of the power supply board is reduced, and a production cost is reduced.

DETAILED DESCRIPTION OF EMBODIMENTS

According to the above described defects, the purpose of the present disclosure is providing an OLED driving power source and an OLED television, by integrating a bridgeless PFC and an auxiliary path LLC control circuit into a control chip, at a same time of satisfying a requirement of the OLED television on a power output stability and a timing control, a circuit structure is optimized, an area of the power supply board is reduced, and a production cost is reduced.

In order to make the purpose, technical solution and the advantages of the present disclosure clearer and more explicit, further detailed descriptions of the present disclosure are stated here, referencing to the attached drawings and some embodiments of the present disclosure. It should be understood that the detailed embodiments of the disclosure described here are used to explain the present disclosure only, instead of limiting the present disclosure.

The OLED driving power source provided by the present disclosure is suitable for a plurality of display related power supply drive adopting an organic light emitting diode (OLED) as a display scheme, including a television, a monitor, an electric teaching, a back projection plasma display and more.

Figure 1:
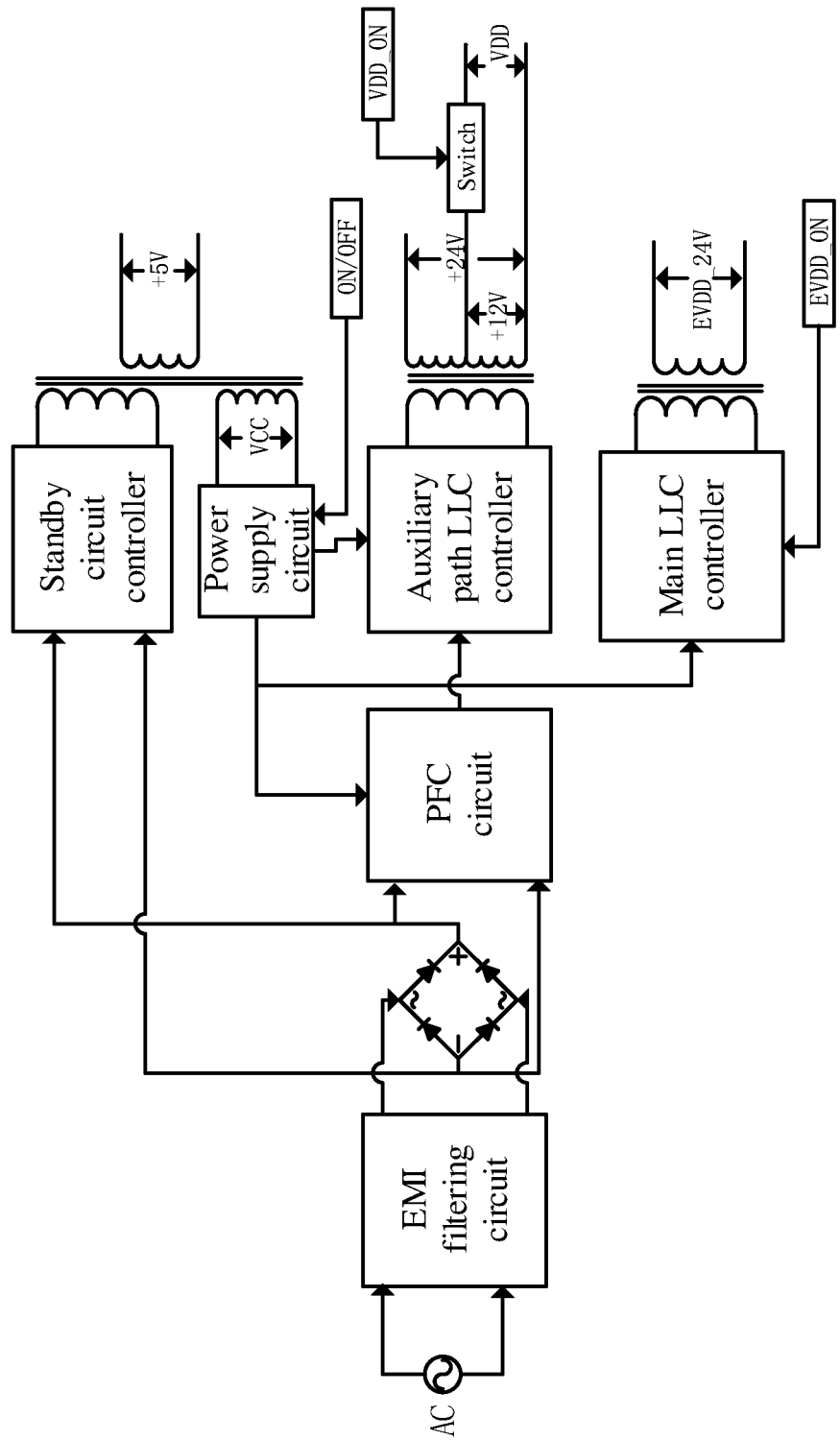
FIG. 1 illustrates a structural schematic diagram of an existing OLED driving power source.
Figure 2:
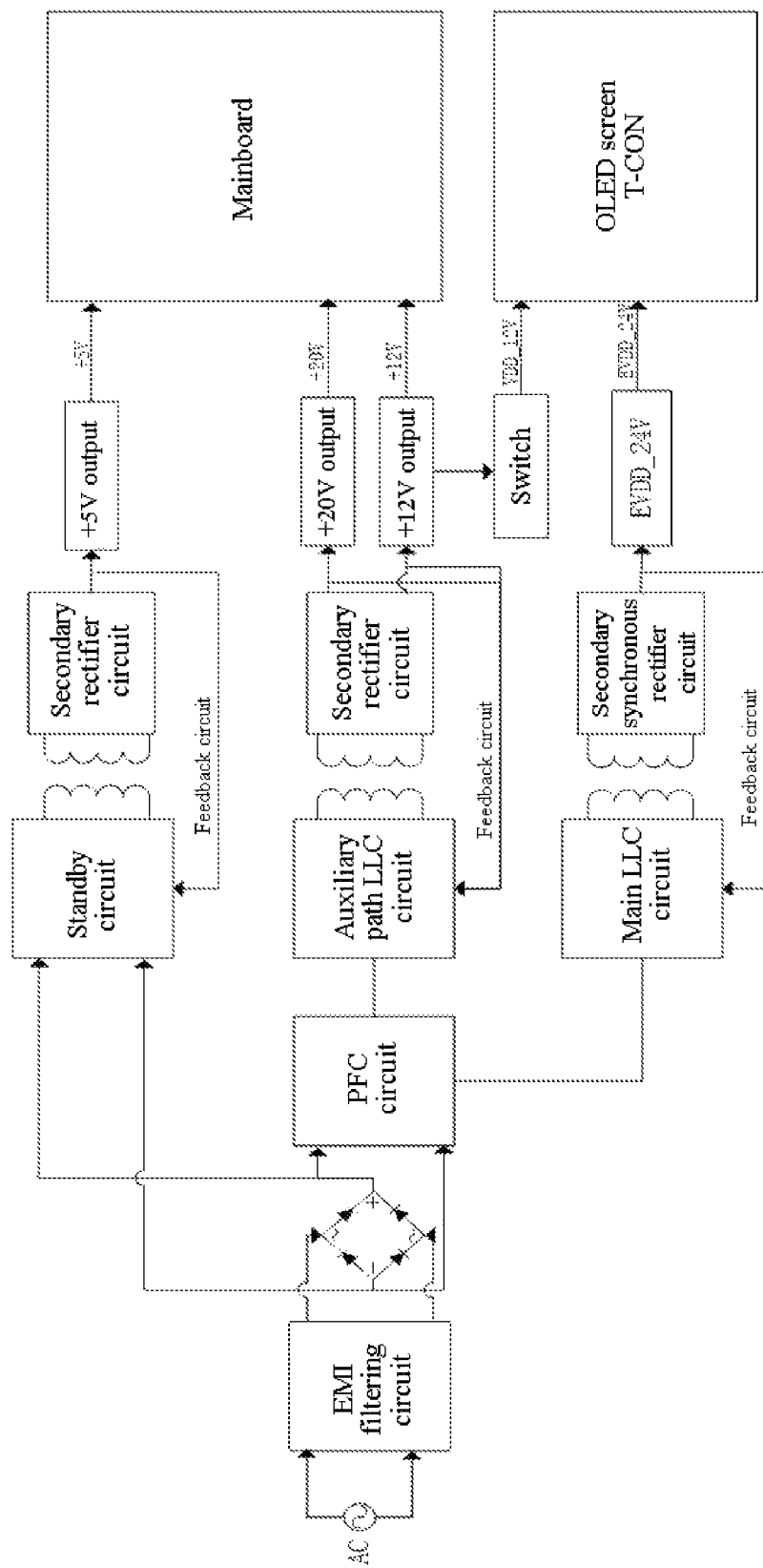
FIG. 2 illustrates a schematic diagram on a power supply circuit for an existing OLED driving power source.
Figure 3:
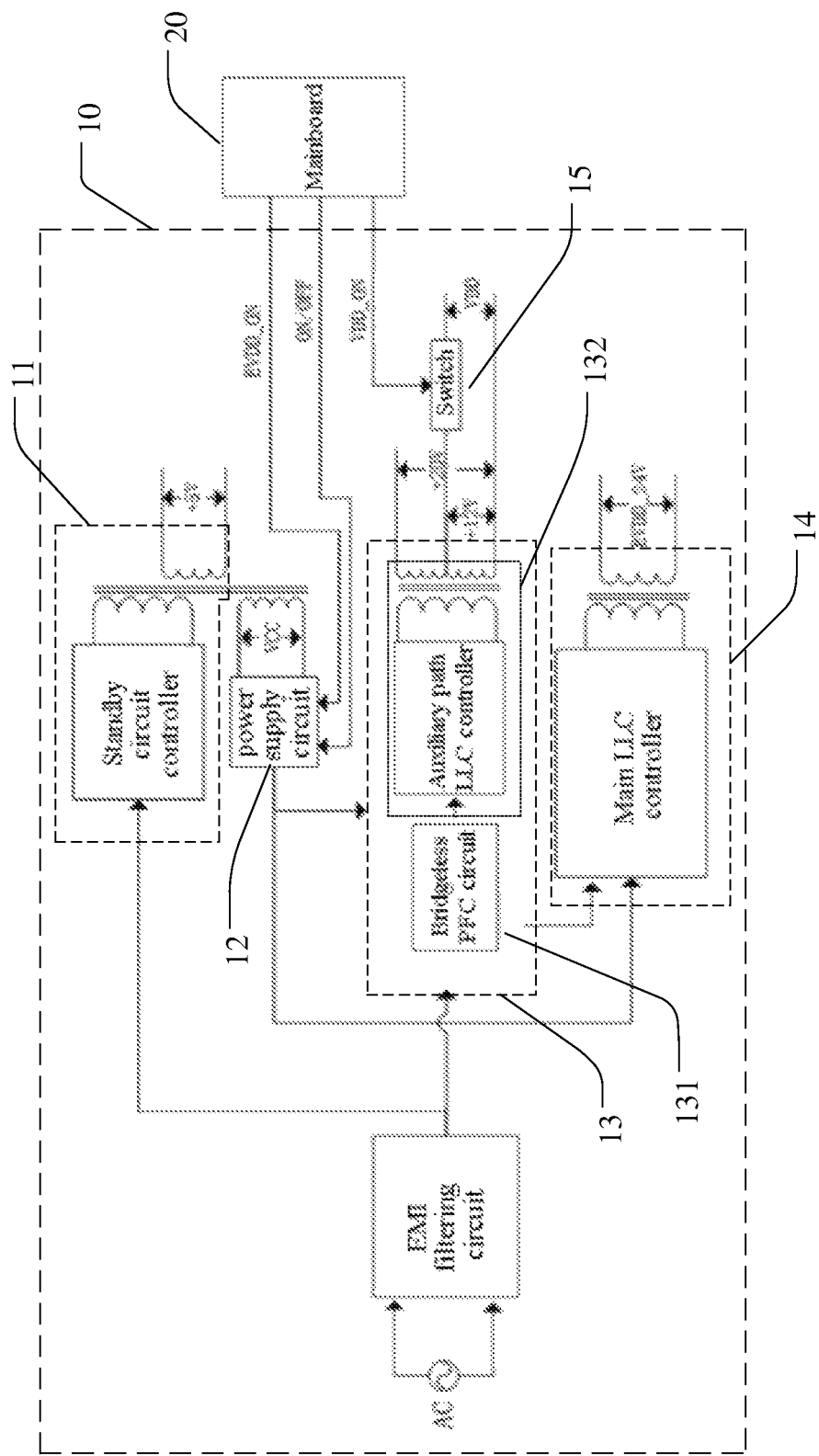
FIG. 3 illustrates a structural schematic diagram of an OLED driving power supply provided by the present disclosure.
Figure 4:
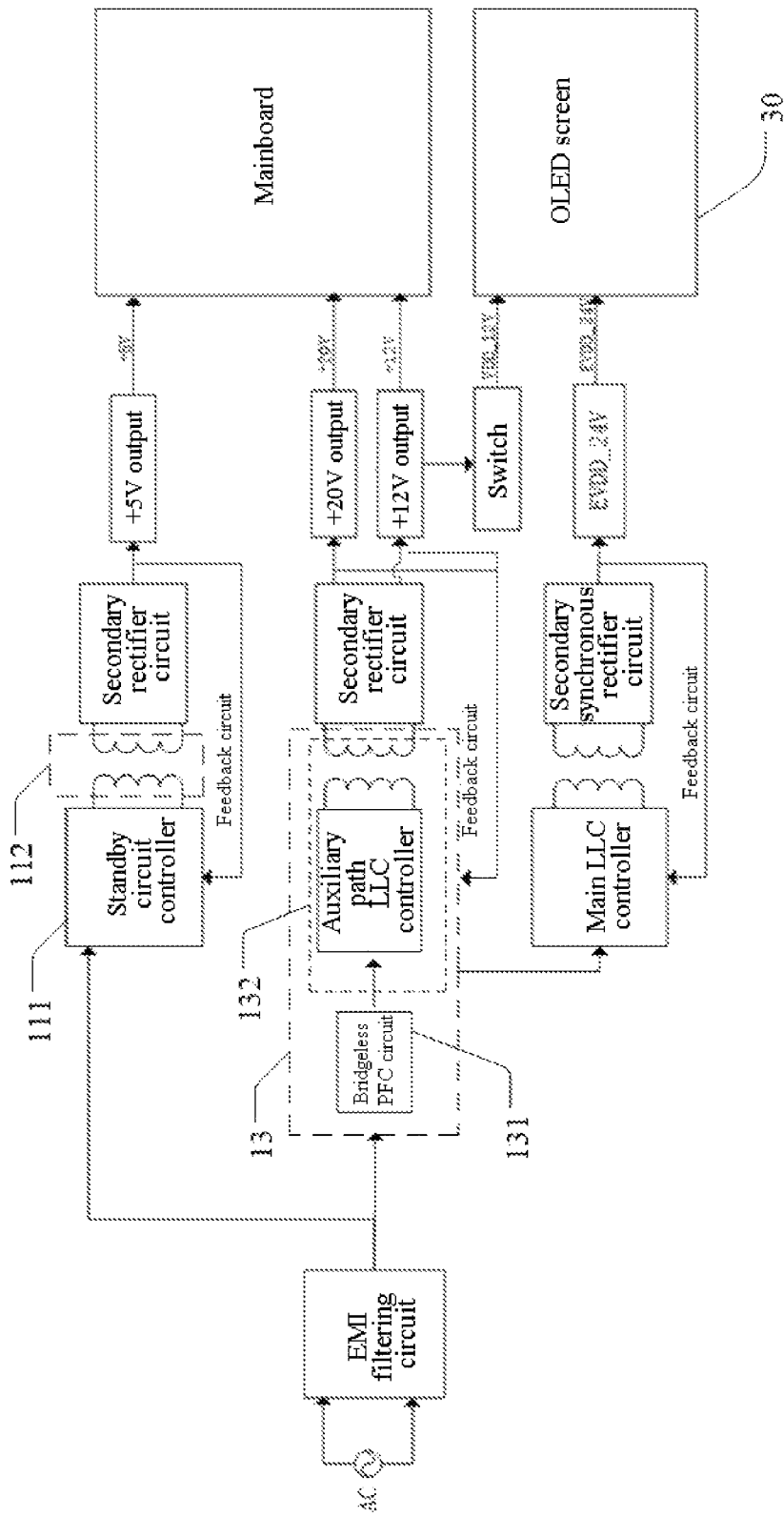
FIG. 4 illustrates a structural schematic diagram on a power supply circuit of the OLED driving power source provided by the present disclosure.

Reffering to FIG. 3 and FIG. 4, the OLED driving power source provided by the present disclosure comprises a power supply board 10 connected with a mainboard 20 and an OLED screen 30, wherein the power supply board 10 comprises a standby circuit 11, a power supply circuit 12, a first conversion module 13, a second conversion module 14 and a switch 15. The standby circuit 11 connects to the power supply circuit 12 and the mainboard 20, while the power supply circuit 12 connects to the mainboard 20, the first conversion module 13 and the second conversion module 14, the first conversion module 13 also connects to the second conversion module 14 and the switch 15, and the switch 15 connects to the mainboard 20 while the second conversion module 14 further connects to the OLED screen 30. After powering on, the standby circuit 11 outputs a supply power (+5V in the present embodiment) to power the mainboard 20 and the power supply circuit 12; the power supply circuit 12 starts the first conversion module 13 according to an on-off signal ON/OFF output from the mainboard 20, the first conversion module 13 outputs a first voltage (+12V in the present embodiment) and a second voltage (+20V in the present embodiment) to supply power to the mainboard 20, and outputs a high-voltage direct current HV-DC to the second conversion module 14; the switch 15 converts the first voltage +12V into a first enabling voltage (VDD_12V in the present embodiment) before outputting to the OLED screen 30 for power according to a first enabling signal VDD_ON output from the mainboard 20; the power supply circuit 12 controls the second conversion module 14 to start according to the second enabling signal EVDD_ON output from the mainboard 20, the second conversion module 14 converts the high-voltage direct current HV_DC into a second enabling voltage (EVDD_24V in the present embodiment) to supply power to the OLED screen 30, thus lighting up the OLED screen 30.

Wherein the first conversion module 13 comprises a bridgeless PFC circuit 131 and an auxiliary path LLC control circuit 132 integrated in a same semiconductor chip package, the bridgeless PFC circuit 131 starts and outputs a high-voltage direct current HV-DCHV-DC to the auxiliary path LLC control circuit 132, the auxiliary path LLC control circuit 132 converts the high-voltage direct current HV-DCHV-DC into the first voltage +12V and the second voltage +20V before outputting to the mainboard 20 for power. By integrating the bridgeless PFC circuit 131 and the auxiliary path LLC control circuit 132 into one control chip, and omitting a special standby circuit, at a same time of satisfying a requirement of the OLED television on a power output stability and a timing control, a circuit structure is optimized, an area of the power supply board 10 is reduced, and a production cost is reduced.

Further, the power supply circuit 12 comprises an on-off control circuit (not shown in the FIG.s) and an enabling switching circuit (not shown in the FIG.s). The on-off control circuit connects to the mainboard 20, the bridgeless PFC circuit 131, the auxiliary path LLC control circuit 132 and the enabling switching circuit, the enabling switching circuit further connects with the second conversion module 14. The on-off control circuit outputs a first power PFC_VCC to start the bridgeless PFC circuit 131 according to the on/off signal ON/OFF output from the mainboard 20, outputs a second power VCC_VDD to the auxiliary path LLC control circuit 132 for power, and outputs a third power PWM_VCC to power the enabling switching circuit according to the high voltage direct current HV-DC output from the bridgeless PFC circuit 131; the enabling switching circuit converts the third power PWM_VCC into a fourth power VCC_EVDD and output to the second conversion module 14 according to the second enabling signal EVDD-ON output from the mainboard 20, that is, providing an electric energy for operation to the bridgeless PFC circuit 131, the auxiliary path LLC control circuit 132 and the main LLC control circuit, through the on-off control circuit and the enabling switching circuit, and controlling to make an orderly work, further satisfying a plurality of requirements of an OLED television on a power supply stability and a timing performance.

In an implementation, the on-off control circuit comprises a first control sub-circuit and a second control sub-circuit, the first control sub-circuit connects to the bridgeless PFC circuit 131, the auxiliary path LLC control circuit 132, and the mainboard 20. The second control sub-circuit connects to the first control sub-circuit, the bridgeless PFC circuit 131 and the enabling switching circuit. The first control sub-circuit outputs the first power PFC_VCC to start the bridgeless PFC circuit 131 according to the on-off signal ON/OFF output from the mainboard 20, and outputs the second power VCC_VDD to power the auxiliary path LLC control circuit 132, and the second control sub-circuit outputs the third power PWM_VCC to the enabling switching circuit according to the high-voltage direct current HV-DC output from the bridgeless PFC circuit 131. By using the first control sub-circuit and the second control sub-circuit to realize an effective control of supplying power to each circuit, a working stability between each circuit is ensured.

Figure 5:
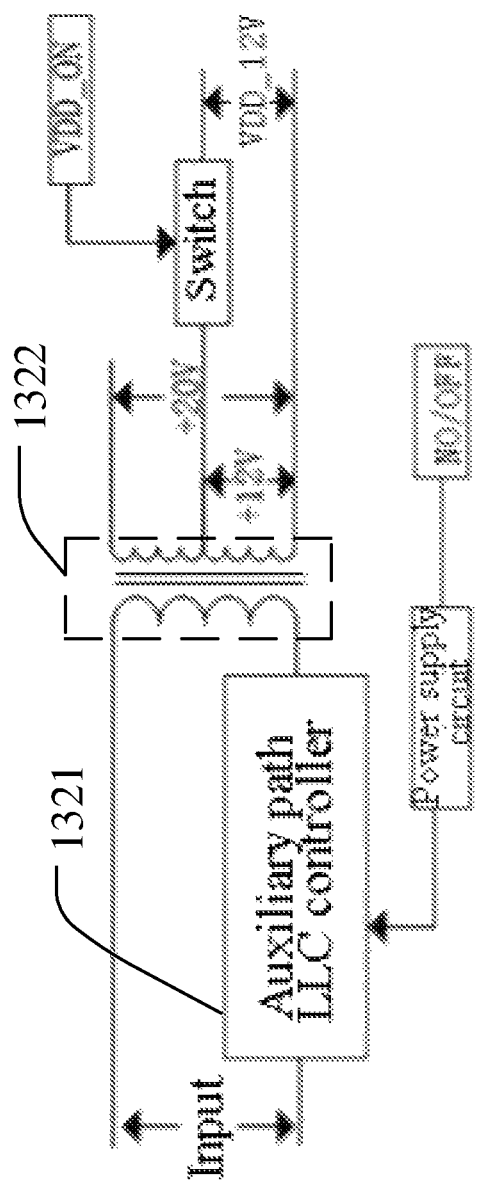
FIG. 5 illustrates a structural block diagram on an auxiliary path LLC control circuit and a power supply circuit of the OLED driving power source provided by the present disclosure.
Figure 6:
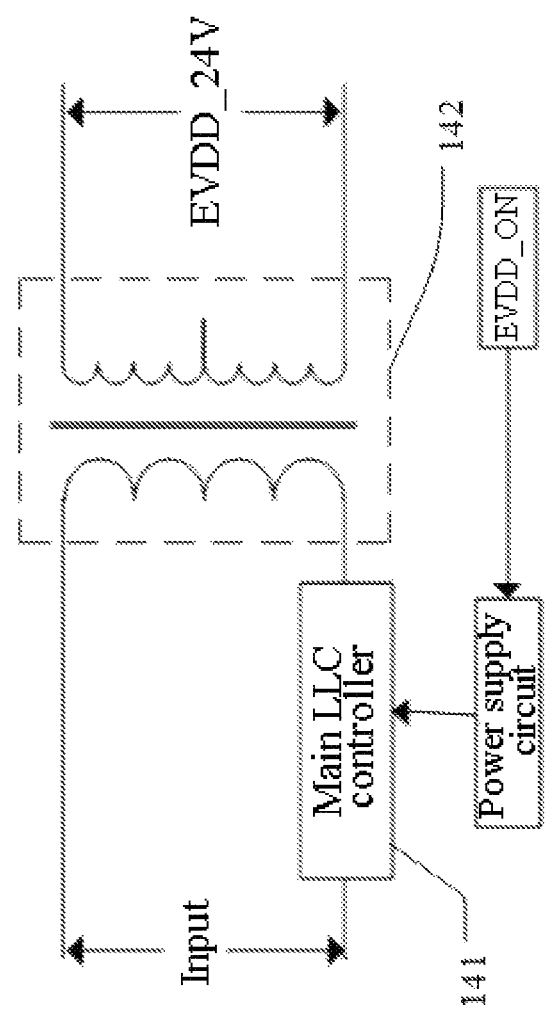
FIG. 6 illustrates a structural block diagram on a second conversion module and a power supply circuit of the OLED driving power source provided by the present disclosure.

Further, referencing to FIG. 5 and FIG. 6 together, the auxiliary path LLC control circuit 132 comprises an auxiliary path LLC controller 1321 and a first transformer 1322, the auxiliary path LLC controller 1321 connects to the power supply circuit 12, while the first transformer 1322 connects to the auxiliary path LLC controller 1321 and the mainboard 20. The auxiliary path LLC controller 1321 starts the first transformer 1322 according to the second power VCC_VDD output from the on-off control circuit, and the first transformer 1322 converts the high-voltage direct current HV-DC output from the bridgeless PFC circuit 131 into the first voltage +12V and the second voltage +20V, before outputting to the mainboard 20. By the auxiliary path LLC control circuit 132 outputting the first voltage +12V and the second voltage +20V simultaneously to the mainboard 20, a normal operation of the mainboard 20 is ensured, while the switch 15 converts the first voltage +12V into the first enabling voltage VDD_12V, before outputting to the OLED screen 30.

Further, since the OLED screen 30 requires a control of both the first enabling voltage VDD_12V and the second enabling voltage EVDD_24V to get light, thus the second conversion module 14 in the present disclosure comprises a main LLC controller 141 and a second transformer 142, the main LLC controller 141 connects to the power supply circuit 12, the second transformer 142 connects to the main LLC controller 141 and the mainboard 20, the main LLC controller 141 starts the second transformer 142 according to the fourth power VCC_EVDD output from the enabling switching circuit, and the second transformer 142 converts the high-voltage direct current HV-DC output from the bridgeless PFC circuit 131 to the second enabling voltage EVDD_24V to supply power to the OLED screen 30.

Once the switch 15 converts the first voltage +12V into the first enabling voltage VDD_12V according to the first enabling signal output from the main board 20 and outputs the first enabling voltage VDD_12V to the OLED screen 30, the power supply circuit 12 get power after a preset time, that is, the on/off signal is pulled high, to pull the second enabling signal EVDD-ON high, and the main LLC controller 141 starts the second transformer 142 according to the fourth power VCC_EVDD output from the enabling switching circuit. Furthermore, the second transformer 142 converts the high voltage direct current HV-DC output from the bridgeless PFC circuit 131 into the second enabling voltage EVDD_24V to supply power to the OLED screen 30, and light up the OLED screen 30, that is, by integrating the bridgeless PFC and the auxiliary circuit LLC control circuit 132 in one control chip, the OLED driving power source meets the requirement of the OLED television on a power output stability and a timing control, and at the same time a circuit structure is optimized, an size of the power supply is decreased.

In an implementation, the standby circuit 11 includes a standby circuit controller 111 and a third transformer 112. The standby circuit controller 111 outputs a power supply through the third transformer 112 to supply power to the main board 20 and the power supply circuit 12. When the power is supplied, the main board 20 is powered through the standby circuit 11, and the power supply circuit 12 is also supplied by a voltage from an auxiliary winding, thereby ensuring the main board 20 to output related signals and ensuring that the power supply circuit 12 can provide power to other circuits, making the OLED drive power light up the OLED screen 30 effectively.

Figure 7:
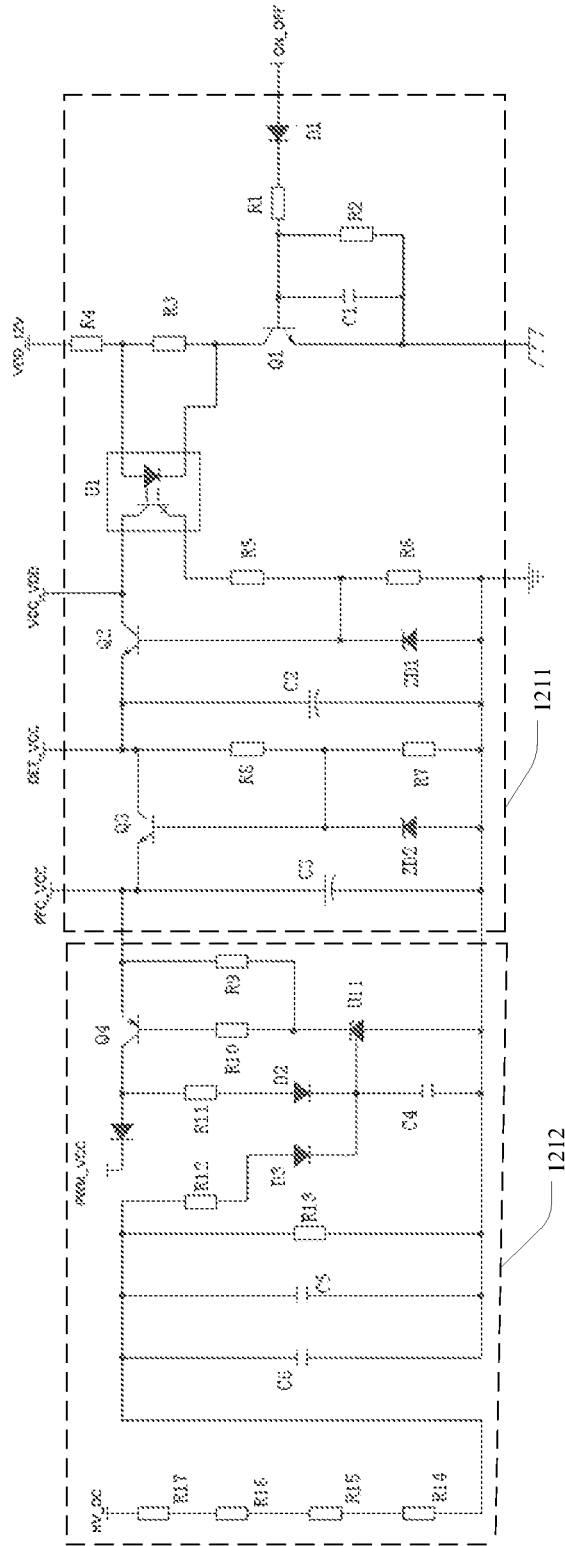
FIG. 7 illustrates a circuit diagram on an on-off control circuit in the OLED driving power source provided by the present disclosure.

Further, referring to FIG. 7, the first control sub-circuit 1211 comprises a first diode D1, a first Zener diode ZD1, a second Zener diode ZD2, a first triode Q1, a second triode Q2, a third triode Q3, a first resistor R1, a second resistor R2, a third resistor R3, a fourth resistor R4, a fifth resistor R5, a sixth resistor R6, a seventh resistor R7, an eighth resistor R8, a first capacitor C1, a second capacitor C2, a third capacitor C3 and a first optical coupler U1.

An anode of the first diode D1 connects to the mainboard 20; a cathode of the first diode D1 connects to one end of the second resistor R2, one end of the first capacitor C1 and a base of the first triode Q1 through the first resistor R1; another end of the second resistor R2, another end of the first capacitor C1 and an emitter of the first triode Q1 are all grounded; a collector of the first triode Q1 connects to a second pin of the first optical coupler U1, and connects to a first pin of the first optical coupler U1 and one end of the fourth resistor R4 through the third resistor R3; a third pin of the first optical coupler U1 connects to one end of the sixth resistor R6, a cathode of the first Zener diode ZD1 and a base of the second triode Q2 through the fifth resistor R5; a fourth pin of the first optical coupler U1 connects to a collector of the second triode Q2 and the auxiliary path LLC control circuit 132 (to output the second power VCC_VDD); an emitter of the second triode Q2 connects to a collector of the third triode Q3 and one end of the eighth resistor R8; another end of the eighth resistor R8 connects to one end of the seventh resistor R7, a base of the third triode Q3 and a cathode of the second Zener diode ZD2; another end of the sixth resistor R6, an anode of the first Zener diode ZD1, another end of the second capacitor C2, another end of the seventh resistor R7, an anode of the second Zener diode ZD2 and one end of the third capacitor C3 are all grounded; an emitter of the third triode Q3 connects to the bridgeless PFC circuit 131 (to output the first power PFC_VCC), the second control sub-circuit and another end of the third capacitor C3.

In the embodiment, the first triode Q1, the second triode Q2, and the third triode Q3 are all NPN triodes, and the first Zener diode ZD1 and the second Zener diode ZD2 can protect the second triode Q2 and the third triode Q3, the model of the first optical coupler U1 is BPC-817C. The first diode D1, the first resistor R1, the second resistor R2, and the first capacitor C1 form a filter voltage dividing circuit, and a divided voltage of the first resistor R1 and the second resistor R2 is a conduction voltage on the base of the first triode Q1 that determines a conduction state of the first triode Q1, and the first capacitor C1 filters the conduction voltage. When the ON/OFF signal is high, the first triode Q1 is in saturation conduction condition, then the first optical coupler U1 is turned on, making the second triode Q2 and the third triode Q3 work, while the first control sub-circuit 1211 outputs the first power PFC_VCC and the second power VCC_VDD, making the bridgeless PFC circuit 131 and the auxiliary path LLC control circuit 132 start to work, so that the bridgeless PFC circuit 131 outputs the high-voltage direct current HV-DC to the second control sub-circuit.

Further, referring to FIG. 7, the second control sub-circuit 1212 includes a ninth resistor R9, a tenth resistor R10, an eleventh resistor R11, a twelfth resistor R12, a thirteenth resistor R13, a fourteenth resistor R14, a fifteenth resistor R15, a sixteenth resistor R16, a seventeenth resistor R17, a fourth triode Q4, a second diode D2, a third diode D3, a fourth diode D4, a fourth capacitor C4, a fifth capacitor C5, a sixth capacitor C6 and a first shunt reference source U11.

An emitter of the fourth triode Q4 connects to the first control sub-circuit 1211, and also connects to one end of the tenth resistor R10 and a negative electrode of the first shunt reference source U11 through the ninth resistor R9; a base of the fourth triode Q4 connects to a negative electrode of the first shunt reference source U11 through the tenth resistor R10; a collector of the fourth triode Q4 connects to an anode of the fourth diode D4, and also connects to an anode of the second diode D2 through the eleventh resistor R11; a cathode of the fourth diode D4 connects to the enabling switching circuit (to output the third power PWM_VCC); a cathode of the second diode D2 connects to a cathode of the third diode D3, a feedback pin of the first shunt reference source U11, and gets grounded through the fourth capacitor C4; a positive electrode of the first shunt reference source U11 gets grounded; an anode of the third diode D3 connects to one end of the thirteenth resistor R13, one end of the fifth capacitor C5, one end of the sixth capacitor C6, and one end of the fourteenth resistor R14 through the twelfth resistor R12. Another end of the thirteenth resistor R13, another end of the fifth capacitor C5, and another end of the sixth capacitor C6 are all grounded; another end of the fourteenth resistor R14 connects with the fifteenth resistor R15, the sixteenth resistor R16, and the seventeenth resistor R17 in series successively and then connects to the bridgeless PFC circuit 131 (to input high voltage DC HV-DC).

In the embodiment, the fourth triode Q4 is a PNP triode, the fourteenth resistor R14, the fifteenth resistor R15, the sixteenth resistor R16 and the seventeenth resistor R17 form a resistive divider group, the ninth resistor R9 and the tenth resistor R10 are mainly applied to adjusting a conduction state of the fourth triode Q4, the fourth diode D4 is mainly applied to separating and filtering, as well as stabilizing an output of the third power PWM_VCC, while the fourth capacitor C4 is mainly applied to filtering a smooth waveform. After the bridgeless PFC outputs the high-voltage direct current HV-DC to the second control sub-circuit 1212, the high-voltage direct current HV-DC passes through the resistive divider group before being divided into a voltage higher than 2.5V to the first shunt reference source U11, the first shunt reference source U11 is turned on to make the base of the fourth triode Q4 in a low level, making the fourth triode Q4 turn on, further making the second control sub-circuit 1212 output the third power PWM_VCC to the enabling switching circuit.

Figure 8:
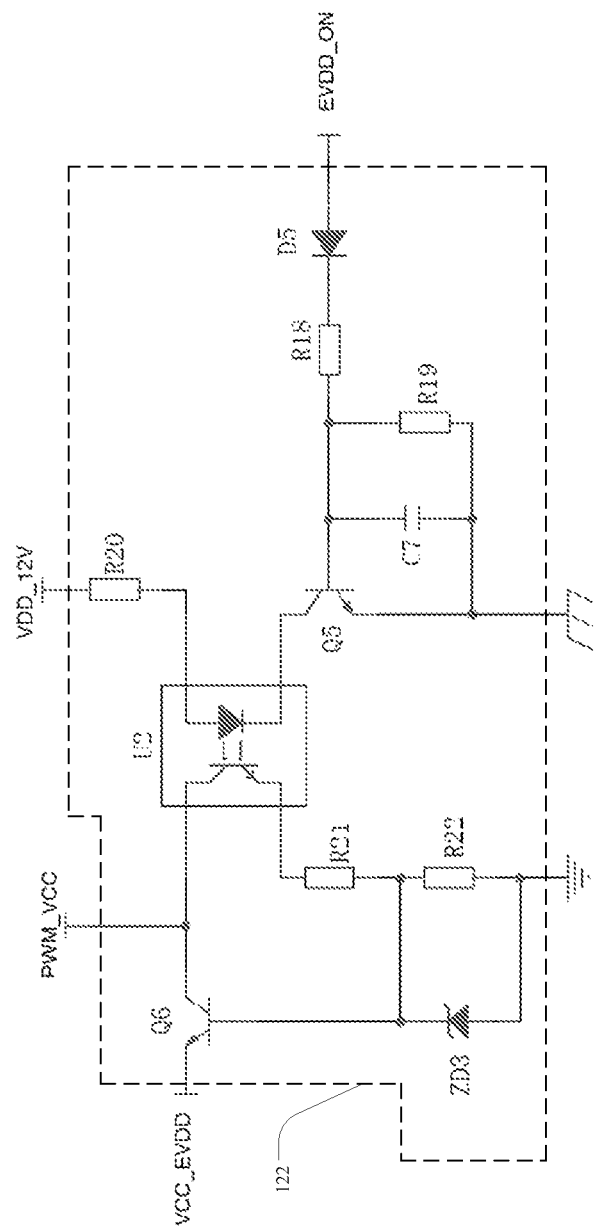
FIG. 8 illustrates a circuit diagram on an enabling switching circuit in the OLED driving power source provided by the present disclosure.

Further, referring to FIG. 8, the enabling switching circuit 122 includes a fifth diode D5, an eighteenth resistor R18, a nineteenth resistor R19, a twentieth resistor R20, a twenty-first resistor R21, a twenty-second resistor R22, a seventh capacitor C7, a fifth triode Q5, a sixth triode Q6, a third Zener diode ZD3 and a second optical coupler U2.

An anode of the fifth diode D5 connects to the main board 20 (to input the second enabling signal EVDD-ON); a cathode of the fifth diode D5 connects to one end of the nineteenth resistor R19, one end of the seventh capacitor C7 and a base of the fifth triode Q5 through the eighteenth resistor R18; another end of the nineteenth resistor R19, another end of the seventh capacitor C7, and an emitter of the fifth triode Q5 are all grounded; a collector of the fifth triode Q5 connects to a second pin of the second optical coupler U2; a first pin of the second optical coupler U2 connects to the on-off control circuit through the twentieth resistor R20; a third pin of the second optical coupler U2 connects to one end of the twenty-second resistor R22, a cathode of the third Zener diode ZD3 and a base of the sixth triode Q6 through the twenty-first resistor R21; a fourth pin of the second optical coupler U2 connects to the on-off control circuit and a collector of the sixth triode Q6; an emitter of the sixth triode Q6 connects to the second conversion module 14; another end of the twenty-second resistor R22 and an anode of the third Zener diode ZD3 are both grounded.

In the embodiment, the fifth triode Q5 and the sixth triode Q6 are both NPN triodes, the fifth diode D5, the eighteenth resistor R18 and the seventh capacitor C7 are mainly applied to filtering a plurality of interference signals in the second enabling signal EVDD-ON input and smoothing a waveform thereof. The twenty-first resistor R21 and the twenty-second resistor R22 are applied to adjusting a conduction state of the sixth triode Q6. A model of the second optical coupler U2 is BPC-817C. When the second enabling signal EVDD-ON is high, the fifth triode Q5 is in saturation conduction condition, making the second optical coupler U2 start to work, the third pin and the fourth pin of the second optical coupler U2 have a current passing through, while a base of the sixth triode Q6 establishes a current conduction, further converting the third power PWM_VCC into the fourth power VCC_ECVDD before outputting to the main LLC controller 141, the second transformer 142 is started by the main LLC controller 141 according to the fourth power VCC_EVDD, the second transformer 142 converts the high-voltage direct current HV-DC output from the bridgeless PFC circuit 131 to the second enabling voltage EVDD_24V to power and light up the OLED screen 30.

Figure 9:
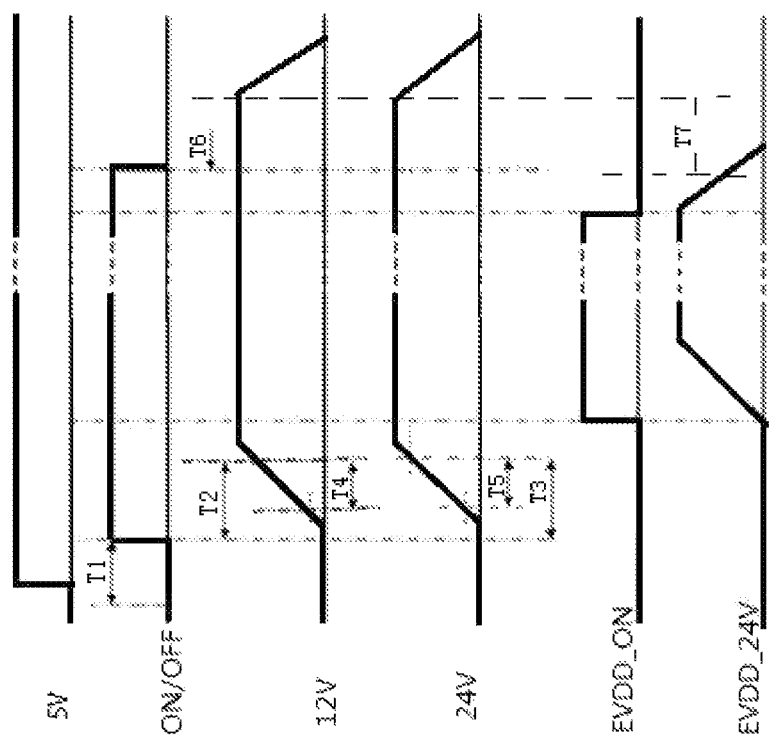
FIG. 9 illustrate an on-off timing diagram of the OLED driving power source provided by the present disclosure.

Further, an on-off timing diagram of the OLED driving power supply provided by the present disclosure is shown in FIG. 9, and a detailed description of a starting process and a standby process of the OLED driving power source provided by the present disclosure is shown in details below in a conjunction of FIG. 3-FIG. 9:

When the AC power is on, the standby circuit 11 outputs a 5V power supply voltage to the main board 20 for power, then the mainboard 20 gives out an ON/OFF signal at a high level, while the third triode Q3 and the first optical coupler U1 are turned on, the first control sub-circuit 1211 starts to supply power to the bridgeless PFC circuit 131 and the auxiliary path LLC control circuit 132, the bridgeless PFC circuit 131 starts to work and outputs the high voltage direct current HV-DC and the auxiliary circuit LLC control circuit 132 converts the high voltage direct current HV-DC into the first voltage +12V and the second voltage +20V to supply power to the mainboard 20. After a period of T1, the output of the first voltage +12V and the second voltage +20V are stable, so that the mainboard 20 works normally, then the first enabling signal is output to the switch 15 after a period of T2, the switch 15 converts the first voltage +12V into the first enabling voltage VDD_12V to the OLED screen 30. However, it requires two ways of voltage to light up the OLED screen 30, thus after a period of T3, the mainboard 20 outputs a second enabling signal EVDD-ON after pulled-up, and the enabling switching circuit 122 outputs the fourth power VCC_EVDD by combining with the third power PWM_VCC output from the second control sub-circuit 1212 to supply power to the main LLC control circuit, while the main LLC control circuit converts the high-voltage direct current HV-DC into the second enabling voltage EVDD_24V before outputting to the OLED screen 30. After a period of T4, an output from the second enabling voltage EVDD_24V is stable, and the OLED screen 30 is lit up.

When the mainboard 20 receives the standby signal, after a period of T5, the mainboard 20 first pulls the second enabling signal (EVDD-ON) down, the power supply circuit 12 does not supply power to the second conversion module 14, and the main circuit does not output the second enabling voltage EVDD_24V. Second, the first enabling signal of the mainboard 20 is also be pulled down, and the switch 15 stops working, and does not output the first enabling voltage VDD_12V. After one more period of T6, the mainboard 20 pulls the on-off signal ON/OFF down, which results in the stop of the output of +12V and +20V, and the bridgeless PFC circuit stops working, making the OLED driving power source enter a standby state, wherein the period of T6 is no less than 30 s.

The present disclosure further provides an OLED television, which comprises the OLED driving power source described above, and due to the OLED driving power source has been described above in details, no more descriptions are stated in details herein.

All above, the present disclosure provides a OLED driving power source and an OLED television, the OLED driving power source comprises a power supply board connected with a mainboard and an OLED screen, the power board comprises a standby circuit 11, a power supply circuit, a first conversion module, a second conversion module and a switch. After powering on, the standby circuit 11 supplies power to the mainboard and the power supply circuit; the power supply circuit starts the first conversion module to output a first voltage and a second voltage to the mainboard for power, and output a high-voltage direct current to the second conversion module. The switch converts the first voltage into a first enabling voltage to supply power to the OLED screen; the power supply circuit starts the second conversion module to convert the high voltage direct current to a second enabling voltage to power and light up the OLED screen; wherein the first conversion module comprises a bridgeless PFC circuit and an auxiliary path LLC control circuit integrated in a same semiconductor chip package. By integrating the bridgeless PFC and the auxiliary path LLC control circuit into one control chip, a circuit structure is optimized, an area of the power supply board is reduced, and a production cost is reduced.

It should be understood that, the application of the present disclosure is not limited to the above examples listed. Ordinary technical personnel in this field can improve or change the applications according to the above descriptions, all of these improvements and transforms should belong to the scope of protection in the appended claims of the present disclosure.

What is claimed is:

1. An OLED driving power source, comprising: a power supply board connected with a mainboard and an OLED screen, wherein the power supply board comprises a standby circuit, a power supply circuit, a first conversion module, a second conversion module and a switch;

after powering on, the standby circuit outputs supply voltage to the mainboard and the power supply circuit; the power supply circuit starts the first conversion module according to an on-off signal output from the mainboard, the first conversion module outputs a first voltage and a second voltage to supply power to the mainboard, as well as outputs a high-voltage direct current (HVDC) to the second conversion module; the switch converts the first voltage into a first enabling voltage before outputting to the OLED screen for power according to a first enabling signal output from the mainboard; the power supply circuit controls the second conversion module to start according to a second enabling signal output from the mainboard, the second conversion module converts the high-voltage direct current into a second enabling voltage to supply power to and light up the OLED screen; and the first conversion module comprises a bridgeless PFC circuit and an auxiliary path LLC control circuit integrated in a same semiconductor chip package, the bridgeless PFC circuit starts and outputs a high-voltage direct current to the auxiliary path LLC control circuit, the auxiliary path LLC control circuit converts the high-voltage direct current into the first voltage and the second voltage before outputting to the mainboard for power, wherein the standby circuit comprises a standby circuit controller and a third transformer, the standby circuit controller outputs supply power to power the mainboard and the power supply circuit through the third transformer.

2. The OLED driving power source according to claim 1, wherein the power supply circuit comprises an on-off control circuit and an enabling switching circuit, the on-off control circuit outputs a first power to start the bridgeless PFC circuit according to the on-off signal output from the mainboard, and outputs a second power to the auxiliary path LLC control circuit for power, and outputs a third power to the enabling switching circuit according to the high-voltage direct current output from the bridgeless PFC circuit; the enabling switching circuit converts the third power into a fourth power before outputting to the second conversion module according to the second enabling signal output from the mainboard.

3. The OLED driving power source according to claim 2, wherein the auxiliary path LLC control circuit comprises an auxiliary path LLC controller and a first transformer, the auxiliary path LLC controller starts the first transformer according to the second power output from the on-off control circuit, and the first transformer converts the high-voltage direct current output from the bridgeless PFC circuit into the first voltage and the second voltage before outputting to the mainboard.

4. The OLED driving power source according to claim 2, wherein the second conversion module comprises a main LLC controller and a second transformer, the main path LLC controller starts the second transformer according to the fourth power output from the enabling switching circuit, the second transformer converts the high-voltage direct current output from the bridgeless PFC circuit into the second enabling voltage to power the OLED screen.

5. The OLED driving power source according to claim 2, wherein the on-off control circuit comprises a first control sub-circuit and a second control sub-circuit, the first control sub-circuit outputs the first power to start the bridgeless PFC circuit according to the on-off signal output from the mainboard, and outputs the second power to the auxiliary path LLC control circuit, and the second control sub-circuit outputs the third power to the enabling switching circuit according to the high-voltage direct current output from the bridgeless PFC circuit.

6. The OLED driving power source according to claim 5, wherein the first control sub-circuit comprises a first diode, a first Zener diode, a second Zener diode, a first triode, a second triode, a third triode, a first resistor, a second resistor, a third resistor, a fourth resistor, a fifth resistor, a sixth resistor, a seventh resistor, an eighth resistor, a first capacitor, a second capacitor, a third capacitor and a first optical coupler;

an anode of the first diode connects to the mainboard; a cathode of the first diode connects to one end of the second resistor, one end of the first capacitor and a base of the first triode through the first resistor; another end of the second resistor, another end of the first capacitor and an emitter of the first triode are all grounded; a collector of the first triode connects to a second pin of the first optical coupler, and connects to a first pin of the first optical coupler and one end of the fourth resistor through the third resistor; a third pin of the first optical coupler connects to one end of the sixth resistor, a cathode of the first Zener diode and a base of the second triode through the fifth resistor; a fourth pin of the first optical coupler connects to a collector of the second triode and the auxiliary path LLC control circuit; an emitter of the second triode connects to a collector of the third triode and one end of the eighth resistor; another end of the eighth resistor connects to one end of the seventh resistor, a base of the third triode and a cathode of the second Zener diode; another end of the sixth resistor, an anode of the first Zener diode, another end of the second capacitor, another end of the seventh resistor, an anode of the second Zener diode and one end of the third capacitor are all grounded; an emitter of the third triode connects to the bridgeless PFC circuit, the second control sub-circuit and another end of the third capacitor.

7. The OLED driving power source according to claim 6, wherein the first triode, the second triode and the third triode are all NPN triodes.

8. The OLED driving power source according to claim 6, wherein a model of the first optical coupler is BPC-817C.

9. The OLED driving power source according to claim 5, wherein the second control sub-circuit includes a ninth resistor, a tenth resistor, an eleventh resistor, a twelfth resistor, a thirteenth resistor, a fourteenth resistor, a fifteenth resistor, a sixteenth resistor, a seventeenth resistor, a fourth triode, a second diode, a third diode, a fourth diode, a fourth capacitor, a fifth capacitor, a sixth capacitor and a first shunt reference source; and an emitter of the fourth triode connects to the first control sub-circuit, and also connects to one end of the tenth resistor and a negative electrode of the first shunt reference source through the ninth resistor; a base of the fourth triode connects to a negative electrode of the first shunt reference source through the tenth resistor; a collector of the fourth triode connects to an anode of the fourth diode, and also connects to an anode of the second diode through the eleventh resistor; a cathode of the fourth diode connects to the enabling switching circuit; a cathode of the second diode connects to a cathode of the third diode, a feedback pin of the first shunt reference source, and gets grounded through the fourth capacitor; a positive electrode of the first shunt reference source gets grounded; an anode of the third diode connects to one end of the thirteenth resistor, one end of the fifth capacitor, one end of the sixth capacitor, and one end of the fourteenth resistor through the twelfth resistor; another end of the thirteenth resistor, another end of the fifth capacitor, and another end of the sixth capacitor are all grounded; another end of the fourteenth resistor connects with the fifteenth resistor, the sixteenth resistor, and the seventeenth resistor in series successively and then connects to the bridgeless PFC circuit.

10. The OLED driving power source according to claim 9, wherein the fourth triode is a PNP triode.

11. The OLED driving power source according to claim 2, wherein the enabling switching circuit includes a fifth diode, an eighteenth resistor, a nineteenth resistor, a twentieth resistor, a twenty-first resistor, a twenty-second resistor, a seventh capacitor, a fifth triode, a sixth triode, a third Zener diode and a second optical coupler; and an anode of the fifth diode connects to the main board; a cathode of the fifth diode connects to one end of the nineteenth resistor, one end of the seventh capacitor and a base of the fifth triode through the eighteenth resistor; another end of the nineteenth resistor, another end of the seventh capacitor, and an emitter of the fifth triode are all grounded; a collector of the fifth triode connects to a second pin of the second optical coupler; a first pin of the second optical coupler connects to the on-off control circuit through the twentieth resistor; a third pin of the second optical coupler connects to one end of the twenty-second resistor, a cathode of the third Zener diode and a base of the sixth triode through the twenty-first resistor; a fourth pin of the second optical coupler connects to the on-off control circuit and a collector of the sixth triode; an emitter of the sixth triode connects to the second conversion module; and another end of the twenty-second resistor and an anode of the third Zener diode are both grounded.

12. The OLED driving power source according to claim 11, wherein the fifth triode and the sixth triode are both NPN triodes.

13. The OLED driving power source according to claim 11, wherein a model of the second optical coupler is BPC-817C.

14. An OLED television, wherein comprising the OLED driving power source according to claim 1.

* * * * *